US008641533B2

(12) United States Patent
Araico Cao

(10) Patent No.: US 8,641,533 B2
(45) Date of Patent: Feb. 4, 2014

(54) SYSTEM AND METHOD FOR PLAYING A PROGRESSIVE JACKPOT GAME, AND PLAYER INPUT DEVICE

(75) Inventor: Julio Cesar Araico Cao, Brussels (BE)

(73) Assignee: International Casino Systems Europe B.V., Amsterdam (NL)

( * ) Notice: Subject to any disclaimer, the term of this patent is extended or adjusted under 35 U.S.C. 154(b) by 516 days.

(21) Appl. No.: 11/663,308

(22) PCT Filed: Sep. 20, 2005

(86) PCT No.: PCT/EP2005/010257
§ 371 (c)(1), (2), (4) Date: Sep. 14, 2007

(87) PCT Pub. No.: WO2006/032498
PCT Pub. Date: Mar. 30, 2006

(65) Prior Publication Data

US 2008/0099993 A1 May 1, 2008

(30) Foreign Application Priority Data

Sep. 20, 2004 (EP) .................................... 04077602

(51) Int. Cl.
*A63F 9/24* (2006.01)
*A63F 13/00* (2006.01)
*G06F 17/00* (2006.01)
*G06F 19/00* (2011.01)

(52) U.S. Cl.
USPC ........................................................ 463/46

(58) Field of Classification Search
USPC ........................................................ 463/17
See application file for complete search history.

(56) References Cited

U.S. PATENT DOCUMENTS

| | | | | | |
|---|---|---|---|---|---|
| 5,393,067 | A | * | 2/1995 | Paulsen et al. | 273/292 |
| 5,588,650 | A | * | 12/1996 | Eman et al. | 273/142 B |
| 5,735,525 | A | | 4/1998 | McCrea, Jr. | |
| 5,743,798 | A | * | 4/1998 | Adams et al. | 463/17 |
| 5,743,800 | A | * | 4/1998 | Huard et al. | 463/26 |
| 5,770,533 | A | * | 6/1998 | Franchi | 463/42 |
| 5,794,964 | A | * | 8/1998 | Jones et al. | 273/309 |
| 5,836,818 | A | * | 11/1998 | Jones et al. | 463/29 |
| 5,934,999 | A | | 8/1999 | Valdez et al. | |
| 6,059,659 | A | | 5/2000 | Busch et al. | |

(Continued)

FOREIGN PATENT DOCUMENTS

| | | | |
|---|---|---|---|
| CA | 2243738 | A1 | 1/2000 |
| EP | 0443420 | | 8/1991 |
| WO | 98/29169 | | 7/1998 |

*Primary Examiner* — Omkar Deodhar
*Assistant Examiner* — Reginald Renwick
(74) *Attorney, Agent, or Firm* — The Webb Law Firm

(57) ABSTRACT

A system and method for progressive jackpot gaming during a casino game. One or more play tables may be present, each play table comprising a dealer console and a plurality of player input devices. Each of the player input devices is arranged to receive a respective player input. The dealer console is arranged for receiving input concerning one of a plurality of phases of a progressive jackpot game, for controlling an indicator provided on each player input device to indicate to each player the current phase, and for allowing the input of a player for participating in the progressive jackpot game only in a specific subset of the game phases. The dealer console is further arranged for administrating a cashless account for each of the player input devices, and to amend the cashless account according to the received respective player inputs.

18 Claims, 3 Drawing Sheets

(56) References Cited

U.S. PATENT DOCUMENTS

| | | | | |
|---|---|---|---|---|
| 6,638,167 | B1 * | 10/2003 | Sawyer et al. | 463/26 |
| 6,776,714 | B2 * | 8/2004 | Ungaro et al. | 463/27 |
| 7,651,394 | B2 * | 1/2010 | Johnson | 463/26 |
| 2003/0036426 | A1 * | 2/2003 | ungaro et al. | 463/27 |
| 2004/0051247 | A1 * | 3/2004 | Phillips | 273/274 |
| 2004/0077425 | A1 | 4/2004 | Goossens | |
| 2005/0239542 | A1 * | 10/2005 | Olsen | 463/27 |
| 2005/0250576 | A1 * | 11/2005 | Kane et al. | 463/17 |
| 2006/0252542 | A1 * | 11/2006 | Nicely | 463/36 |

* cited by examiner

SYSTEM AND METHOD FOR PLAYING A PROGRESSIVE JACKPOT GAME, AND PLAYER INPUT DEVICE

BACKGROUND OF THE INVENTION

1. Field of the Invention

The present invention relates to a system for progressive jackpot gaming during a casino game comprising one or more play tables, each play table comprising a dealer console and a plurality of player input devices connected to the dealer console, each of the player input devices being arranged to receive a respective player input. In a further aspect, the present invention relates to a method for playing a progressive jackpot game during the play of a casino game with a plurality of players, such as poker, comprising indicating a player's current account balance, and, upon receiving a player's input for participating in the progressive jackpot game, deducting a predetermined amount from the player's account balance. In an even further aspect, the present invention relates to a player input device for use in a system for progressive jackpot gaming according to the present invention.

2. Description of the Related Art

Canadian patent application CA-A-2,243,738 discloses a method for playing two casino games and a method and an apparatus for related progressive jackpot. A play table, e.g. a poker game table, comprises a dealer console and a plurality of player consoles. Each player console comprises a display for indicating a player's account balance, a key, and an optional cash-in slot. The dealer's console comprises a number of displays and keys which allow the dealer to monitor and control the games played at the table, including a side bet possibility, e.g. the progressive jackpot game. The key on the player console can be lit to indicate that the player participates in the side bet, or can be off to indicate the player is not participating. The visual indication in this case, is only used for indicating whether a player is participating in the side bet or not. This is necessary as there is no coin or token present to indicate such a player input for a side bet. According to the publication, it is possible for a player to press the key at any time, but the corresponding action (decrementing the account balance, lighting the key to indicate participation) depends on other factors, such as initiating a game by the dealer. Thus, for a player, it is very unclear when it is allowed during the casino game to make a side bet. The key will not always be lit directly after pressing the key, or inserting a coin or token in the cash-in slot.

SUMMARY OF THE INVENTION

The present invention seeks to provide an apparatus and a method for playing a progressive jackpot game, and a player input device for use with such an apparatus, which provides a more readily understandable and appealing concept for playing a side game during a casino game.

In a first aspect, a system according to the preamble above is provided, in which the dealer console is arranged for receiving input (e.g. from a dealer) concerning one of a plurality of phases of the progressive jackpot game, for controlling an indicator provided on each of the plurality of player input devices to indicate to each player the current phase of the progressive jackpot game, and for allowing the input of a player for participating in the progressive jackpot game only in a specific subset of the plurality of progressive jackpot game phases, in which the dealer console is further arranged for administrating a cashless account for each of the plurality of player input devices, and to amend the cashless account according to the received respective player inputs. The phase in which inputting a bet for the progressive jackpot is allowed, is different from the phase in which inputting a bet for the (main) casino game is allowed (i.e. the start and/or end time of the betting allowed phase is different). Such a system allows to play a casino game with an associated progressive jackpot game for players on a single table, or for players on multiple tables. Using cashless accounts, it is no longer necessary to use coins or tokens for participating in the progressive jackpot game. Also, the otherwise used coins or tokens need no longer be collected, e.g. by the table dealer, or using a collection box. Additionally, the system may be arranged to indicate participation of a particular player in a progressive jackpot game upon receipt of that players input.

It is noted that U.S. Pat. No. 5,743,798 discloses an apparatus for playing a roulette game including a progressive jackpot. This apparatus uses coins (chips, tokens), for inputting a bet for the progressive jackpot game. The roulette bets are placed on the roulette table using chips. No electronic account balance is used for the players, only an electronic sign is present which indicates the present jackpot amount. In this document, there is no separate indicator for the game phase in which a player is allowed to place a bet for the progressive jackpot: only the end moment of allowing bets for the main roulette game is indicated and, in the disclosed system, this end moment coincides with the end moment for allowing bets for the progressive jackpot game.

U.S. Pat. No. 5,934,999 describes a roulette-like gaming apparatus and a method for playing that apparatus. This publication discloses a main game, wherein a percentage of every wager bet is placed into a jackpot. When a player participates in the main game, automatically a percentage of the wager is added to the progressive jackpot. There is no separate and independent betting phase for the progressive jackpot only. The moment of participating in the progressive jackpot game is always the same moment of participating in the main game. Consequently, no indicators are present which indicate the start and end time for placing a progressive jackpot bet.

In an embodiment, the indicator comprises a visual indicator, e.g. in the form of one or more LED's. Furthermore, each of the plurality of player input devices may be further arranged to indicate a winning of a respective player. All these items add to the attractiveness of the game, which will allow to draw more players to the game, and to attract more bets.

The system, in a further embodiment, comprises a central computer connected to each of the dealer consoles, the central computer being arranged to manage the progressive jackpot game (and update the jackpot balance when players have placed bets), and to select one of the plurality of players randomly as a winner. Such a mystery jackpot type of game will even further add to the attractiveness of the game, as it will provide an opportunity to win (part of the) jackpot based on chance, as opposed to (or better in addition to) the opportunity to win (part of the) jackpot based on predetermined rules associated with the casino game.

In an even further embodiment of the present invention, the system for progressive jackpot gaming further comprises a central computer connected to each of the dealer consoles, the central computer being arranged to manage a plurality of progressive jackpot games, and to display the value of each of the plurality of progressive jackpot games. This embodiment provides an attractive further alternative for players and casino's, in addition to the single prize progressive jackpot game, the partial prize jackpot game, and the mystery jackpot game. The plurality of progressive jackpot games may accrue prize values of different value.

The system, in a further embodiment, comprises a further indicator for indicating whether or not a player has placed a bet for the progressive jackpot game. Such an indication is provided in addition to the indication of the game phase in which betting is allowed for the progressive jackpot game, in order to further enhance the clarity of the game for the players.

In an even further embodiment, multiple player inputs (e.g. two or three) are allowed in the specific one of the plurality of progressive jackpot game phases. Such a multiple bet in a single round of play may increase the amount of a bonus (or a mystery jackpot prize) which can be won, e.g. threefold for a double bet, and five-fold for a triple bet. The multiple input may also be visualized using multiple indicators (e.g. two or three LED's) or a further numeric display.

In an even further aspect, the present invention relates to a player input device for use in a system for progressive jackpot gaming according to the present invention, comprising an input device, e.g. a switch, for receiving a player input for participation in a progressive jackpot game, and an indicator for indicating one of a plurality of progressive jackpot game phases. Additionally the player input device may be provided with a further indicator for indicating the account value of the player.

The indicator is e.g. a light emitting element integrated in the player input device. As the indicator is integrated with the player input device, it is easy to install (a number of) player input devices in a playing table, during manufacture of the playing table or at a later moment. The indicator may comprise a plurality of light elements, such as LED's, e.g. on the perimeter of the player input device. The indicator may be arranged to provide an appealing visual effect, such as flashing, lighting in a predetermined pattern, etc. The indicator may also be arranged to show different colors to indicate different phases of the progressive jackpot game, or to indicate a winning of the respective player.

The player input device, in an even further embodiment, further comprises a card reader. With the card reader, the player can use a debit card or client card with an electronic account balance to participate in the progressive jackpot game.

In an even further aspect, a method according to the preamble defined above is provided, in which the method comprises indicating one of a plurality of progressive jackpot game phases, in which the input of a player for participating in the progressive jackpot game is only allowed in a specific subset of the plurality of progressive jackpot game phases. This provides a possibility for playing a progressive jackpot game as a side bet for a casino game, in which the allowance and possibility of placing a bet is much more clear to the players. The method according to the present invention will increase the player's confidence in playing the progressive jackpot game, and increase the player's betting impulse. The present game is physically attractive because of the clear indication of the game phases, but also transparent and trustworthy for the players. This will increase the number of bets placed, and thus the revenue of the game in total. In addition, the player's participation in the progressive jackpot game may be indicated.

In a further embodiment, the indicating comprises providing a visual indication, e.g. with the aid of small lights on the table. This embodiment even provides additional attractiveness of the game, both for players and spectators.

The player's account balance is in a further embodiment, an electronic account balance. This embodiment eliminates the need for an additional cash-in slot or the like for depositing a coin or token in order to participate in the progressive jackpot game.

In an even further embodiment, one of the plurality of players is randomly selected as a winner. This added possibility to win (a part of) the jackpot balance will add to the attractiveness of the progressive jackpot game. Also, it will result in more players placing a side bet, as the chance of winning a (part of the) jackpot balance is not longer determined by predetermined rules associated with the casino game (e.g. certain hands in poker, such as a royal flush), but on pure chance.

Whether or not a player has input a bet for the progressive jackpot game may be indicated next to the indication of game phases in a further embodiment, in order to improve the clarity and understandability of the progressive jackpot game.

A player may be allowed to place multiple bets in the specific one of the plurality of progressive jackpot game phases, e.g. to increase the player's possible winnings.

DESCRIPTION OF THE PREFERRED EMBODIMENTS

Figure 1:
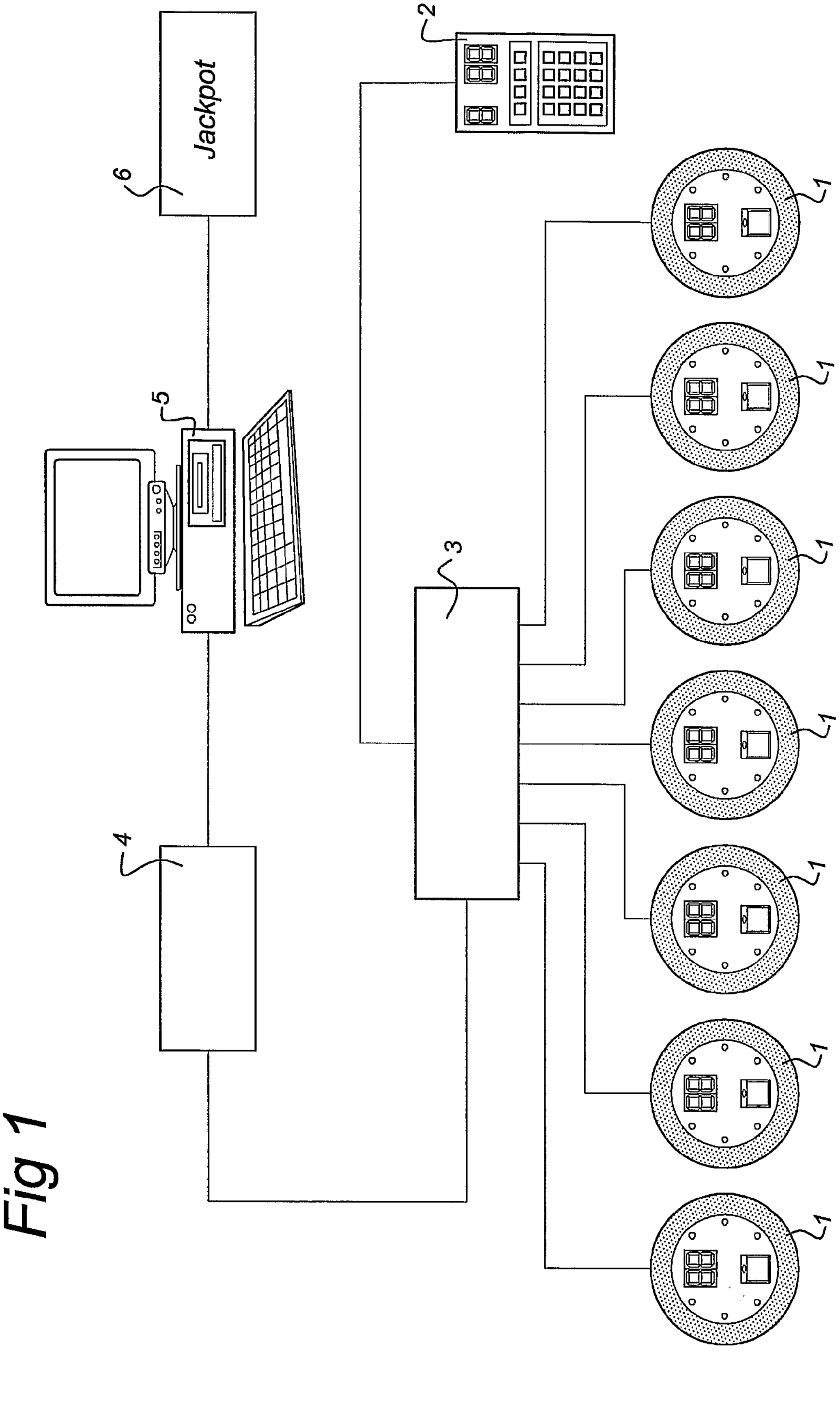
FIG. 1 is a schematic diagram of an embodiment of a cashless jackpot system according to an embodiment of the present invention.

In a first exemplary embodiment of the present cashless jackpot system, which allows to play a progressive jackpot game in addition to a regular (casino) game, such as poker, a plurality of player input devices 1 and a dealer key set or dealer console 2 are provided on each playing table. A schematic view of this cashless jackpot system is shown in FIG. 1. The plurality of player input devices 1 are connected to the dealer console 2, e.g. as indicated in the embodiment of FIG. 1 via a connection box 3. The connection box 3 is connected to a central processing system 5, such as a personal computer, which in turn is connected to a display 6. The connection between computer 5 and connection box 3 may be provided using a multiplexer 4, as shown in FIG. 1, which allows to connect a plurality of player tables provided with a connection box 3, player input devices 1 and dealer console 2.

The connection box 3 may be arranged to allow communication between player input devices 1 and dealer console 2, between dealer console 2 and computer 5 (via multiplexer 4), and possibly also between player input devices 1 and computer 5.

The plurality of player tables may be arranged for the same casino game, like casino games (e.g. different types of poker), or different casino games (poker, roulette, blackjack, etc.). This allows to play a progressive jackpot game, of which the total prize money amount is indicated on the display 6, with one player table or multiple player tables. The progressive jackpot game may be won e.g. when a player obtains a predetermined hand of cards in a casino game (e.g. royal flush). Also, smaller amounts of the total jackpot amount may be won with other predetermined hands of cards.

The display 6 indicating the jackpot value may comprise multiple displays which are installed throughout a casino. A display 6 may be installed at a game table, e.g. using the connection box 3, or at other places in the casino, e.g. using multiplexer 4.

Figure 2:
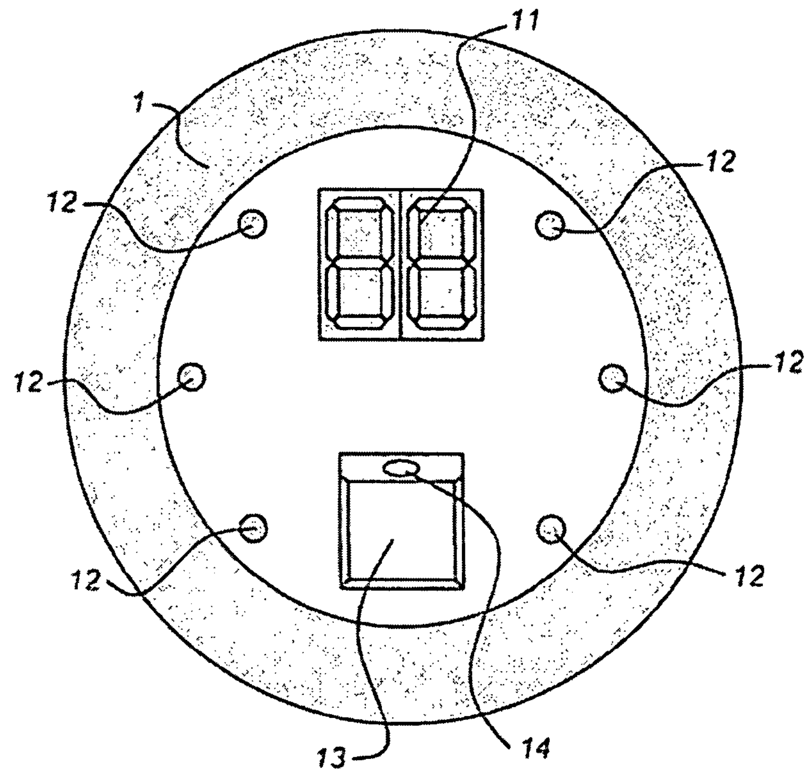
FIG. 2 is a top view of a player input device used in the cashless jackpot system of FIG. 1.

FIG. 2 shows a top view of one of the player input devices 1. Such a player input device 1 is provided for each player on a table, and allows this player to participate in a progressive jackpot game in a simple and readily understandable manner. The player input device 1 is provided with an account display 11, a number of phase indicators 12, and an input key 13. The input key 13 is optionally provided with a further indicator 14, e.g. for indicating that a bet has been placed.

In an alternative embodiment, the player input device 1 may comprise a single display, such as a TFT display, which combines the functions of the account display 11, phase indicators 12, input key 13 (e.g. touch sensitive screen of TFT display) and further indicator 14.

Figure 3:
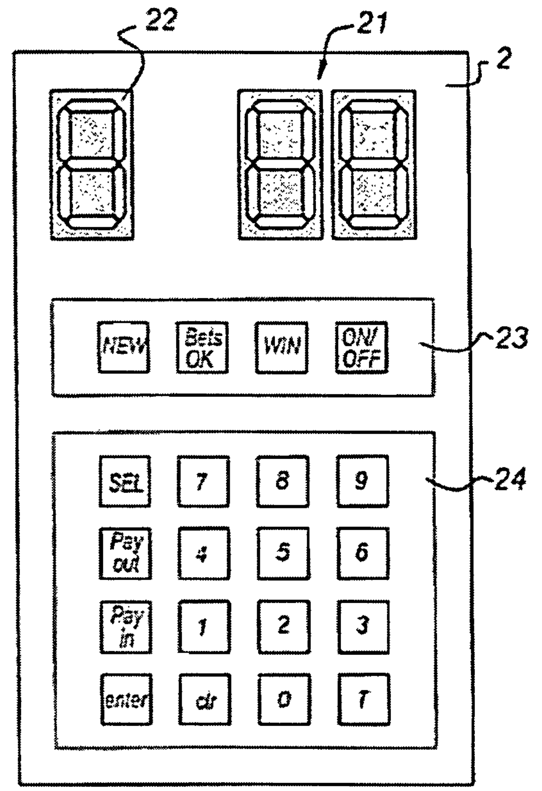
FIG. 3 is a top view of a dealer key set used in the cashless jackpot system of FIG. 1.

FIG. 3 shows a top view of the dealer console 2 as used in the cashless jackpot system of FIG. 1. The dealer console 2 is provided with a primary display 21 indicating an account value or balance, a secondary display 22 indicating a player identification, a first key set 23 with a number of keys and a second key set 24 comprising a numeral keyboard and further keys. Using the first key set 23, the dealer of a table can control the progress of a casino game, including the progressive jackpot game. Using the second key set 24, the dealer can monitor and control the current account balances and bets of the various players on the table.

Figure 4:
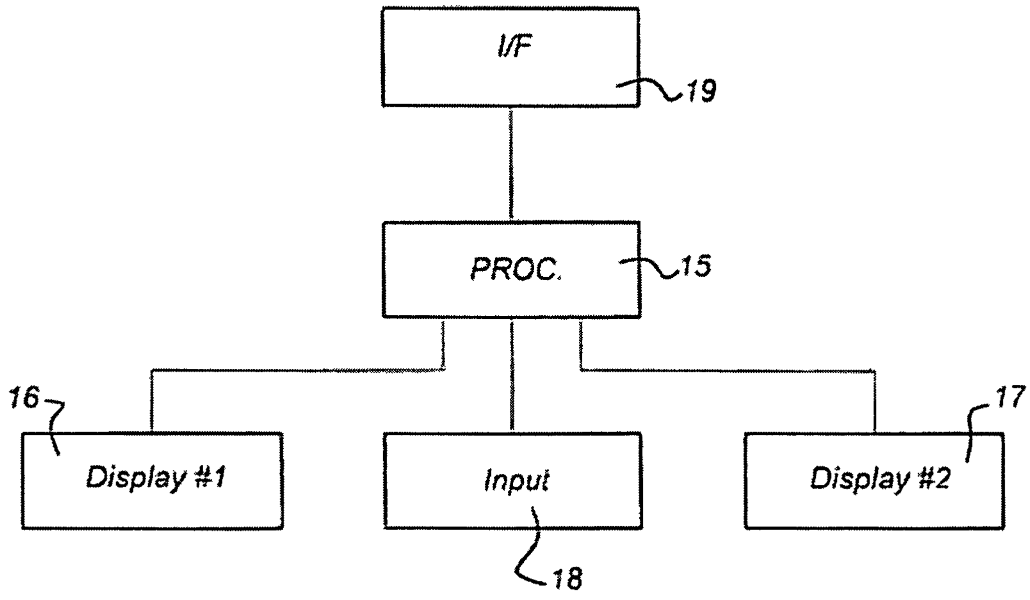
FIG. 4 is a schematic block diagram of a player input device according to an embodiment of the present invention.

A schematic diagram of the electronics of an embodiment of the player input device 1 is shown in FIG. 4. The player input device 1 comprises a processor 15, connected to a first display 16 (e.g. the account display 11 in FIG. 2), a second display 17 (e.g. the phase indicators 12 of FIG. 2), and an input unit 18 (e.g. the input key 13 of FIG. 1). Furthermore, the processor 15 is connected to an interface unit 19 for communicating with the dealer console 2 (via connection box 3). The processor 15 may be a microprocessor or microprocessor system under control of a software program, and may be provided with suitable memory units, such as semiconductor memory (RAM, ROM, etc.). Alternatively, the processor 15 may be of a simpler design, e.g. in the form of analog or digital circuitry, which is arranged to properly control the first display 16, second display 17 and input unit 18.

The same arrangement or a similar arrangement may be used as the electronics of the dealer console 2. In this case, the first display 16 corresponds to the primary display 21, second display 17 corresponds to the secondary display 22, and the input unit 18 corresponds to the first key set 23 in combination with the second key set 24.

The cashless jackpot system as presented in this embodiment is a cashless system, as there are no possibilities for the players to participate in the casino game or progressive jackpot game by inserting coins or tokens in a dedicated slot, as in many present day set-ups. The players accounts may be managed by the table dealer using his dealer console 2, using the second key set 24. A player can hand over tokens or money to the dealer, after which the dealer updates that player's account, e.g. using the key labeled 'SEL' to select the player's table position and the key labeled 'pay in' to update the player's account. Alternatively, the player's account can be updated using a credit card (and associated debiting procedure). Also, it is possible to use a client card, in the form of a magnetic strip card or smart card with am integrated chip, and an associated card reading apparatus at each table, or even at each player location on a table. The player can raise the balance stored on the client card, e.g. at a central location in a casino, using cash money or a credit card, and can then use the client card at a specific table to participate in the progressive jackpot game.

The dealer can control the progressive jackpot game using the first keyboard 23, e.g. using the key labeled 'NEW' to start a new period in which placing a bet is allowed, the key labeled 'Bets Ok' to accept the bets on this table, and to update the jackpot total on the display 6 via the computer 5. When a player shows a hand of cards that corresponds to one of the possible winning hands for the progressive jackpot game (e.g. royal flush), this can be input by the dealer using the key labeled 'WIN', e.g. followed by the selection of the winning player ('SEL' plus player number on second key set 24). Also, an 'on/off' key may be provided which the dealer can use to switch on or off the table for the progressive jackpot game.

The progressive jackpot game has several phases, which are controlled by the dealer using his dealer console 2. The phases may include, but are not limited to a pre-start phase, a betting allowed phase, and a betting not allowed phase. These phases are in general different from the game phases of the (main) casino game, although the start time or end time may coincide. The pre-start phase corresponds to a state in which a player is permitted to add credits to or activate a cashless account having credits associated therewith corresponding to the player; the betting allowed phase corresponds to a state in which the player is permitted to select the amount of credits to bet, wherein a visual indication of the betting allowed phase is different than a visual indication of the pre-start phase; and the betting not allowed phase corresponds to a state in which the player is prohibited from adding credits to or activating the cashless account until the pre-start phases begins, wherein a visual indication of the betting not allowed phase is different than the visual indication of the betting allowed phase and the pre-start phase. Also a winning phase may be indicated, e.g. when one of the players has a hand of cards corresponding to a predefined set of winning cards, such as a royal flush.

In many present day progressive jackpot games, it is not immediately clear to the player in which phase the progressive jackpot game is, as only the main casino game phases are indicated, or only participation in the progressive jackpot game is indicated. This may lead to placing of bets by players just in time (or just too late, with the resulting possible discussion with the dealer) or to players not betting on the progressive jackpot at all (leading to lower jackpot amount and less profit). The player input device 1 is provided with phase indicators 12, which are controlled as a result of the dealer actions on the dealer console 2. In a specific embodiment, the phase indicators 12, e.g. in the form of LED's, will flash to indicate to a player that it is allowed to place a bet for the progressive jackpot game. This phase may also be indicated differently, e.g. with a constant lighting of the indicators 12, or a loop light effect of the indicators 12. Also, the various phases may be indicated using different colors, e.g. green for 'betting allowed' and red for 'betting not allowed'.

Placing a bet for the progressive jackpot game may be accomplished by the player by pressing the input key 13. Once the player has pressed the input key 13, this may be fed back by using e.g. the indicator light 14 on the input key 13. The input key 13 input is registered by the processor 15 of the dealer console 2, and when the next phase is entered by the dealer ('Bets OK'), the information which player has placed a bet is transferred to the computer 5. The processor 15 of the dealer console 2 will update the player's account balance and send relative information to the processor of the respective player input device 1 for updating the account display 11. The computer 5 will update the jackpot display 6, e.g. with an amount of 95% of the bets placed by the players.

In an alternative embodiment, the player may press the input key 13 multiple times (e.g. up to a maximum of three times) in order to multiply his chances of winning a prize in the casino game. This may be indicated by further indicator lights 14, or other types of indicators. The higher player input can offer a different, better prize scheme. Normally, a casino game may have one or more progressive or mystery jackpots and different bonus prizes. For players who have input a multiple bet, a higher bonus or mystery prize may be won.

When during the casino game, a player acquires a hand with a winning combination for the progressive jackpot game, the dealer enters this on the dealer console 2 ('WIN' key and player number). Corresponding information is sent to the computer 5, which decrements the jackpot amount indicated on the display 6 with the appropriate amount. Additionally, the winning of the jackpot prize may be indicated on the indicators 12 of the player input device (preferably with a different lighting effect than the indication of the 'betting allowed' phase). This would considerably enlarge the attractiveness of the game, not only for the players but also for the public just monitoring the game.

As mentioned above in relation to the schematic view of FIG. 4, both the player input device 1 and dealer console 2 may be provided with software controlled processors 15. Also, the central computer 5 is in general equipped with a software controlled processor. The functions as described above may be implemented decentralized, i.e. part of the functions are implemented on the central computer 5, part on the processor 15 of the dealer console 2, and part on the processor 15 of the player input device 1. Alternatively, e.g. the processor 15 of the player input device 1 may be implemented as simple analog or digital circuitry, and the functions of controlling the phase indicators 12, account display 11 and input key 13 may then be managed by the processor 15 of the dealer console 2. Other configurations are also possible.

An attractive addition to the progressive jackpot game may be the inclusion of a mystery jackpot. In addition to the possibility to win (part of the) jackpot balance when having a predefined set of cards, it is possible to have the personal computer 5 select one of the players randomly as a winner. This adds to the attractiveness of the game, and will possibly result in more side bets being placed, and thus increased revenue.

For the mystery jackpot, it is determined that in a certain time period a price must be won by a player. The computer 5 may randomly select on which table of multiple tables, in which game round of multiple game rounds, which player of multiple players wins the jackpot prize.

It is also possible to have multiple jackpots in the casino at the same time. E.g. the computer 5 may be programmed to have a winner for a first jackpot once a year, a winner for a second jackpot once every month, etc. The bets input by players can then be used according to predefined rules to increase each of the jackpots with a predetermined amount. Also, it is possible to have multiple progressive jackpot games running in parallel, the prize value of each progressive jackpot game increasing e.g. based on a predetermined group of play tables. The prize values of each progressive jackpot game may be displayed centrally on a single display 6, or decentrally on multiple displays 6.

The invention claimed is:

1. A system for a progressive jackpot game associated with a casino game, wherein the progressive jackpot game is a side-bet for the casino game, the system comprising one or more play tables, each play table comprising a dealer console and a plurality of player input devices connected to the dealer console, each of the player input devices being arranged to receive a respective player input, wherein the dealer console is operated by the dealer for controlling the progressive jackpot game and is configured for:

receiving input concerning at least two of a plurality of phases of the progressive jackpot game, wherein the plurality of phases of the progressive jackpot game comprise:

a pre-start phase corresponding to a state of the system in which the system permits a player to add credits to or activate a cashless account having credits associated therewith corresponding to the player, wherein the pre-start phase is initiated by the dealer using the dealer console;

a betting allowed phase corresponding to a state of the system in which the system permits the player to select the amount of credits to bet, wherein a visual indication of the betting allowed phase is different than a visual indication of the pre-start phase; and a betting not allowed phase corresponding to a state of the system in which the system prohibits the player from adding credits to or activating the cashless account until the pre-start phases begins for subsequent rounds of the progressive jackpot game, wherein a visual indication of the betting not allowed phase is different than the visual indication of the betting allowed phase and the pre-start phase, and wherein the betting not allowed phase is initiated and ended by the dealer using the dealer console;

controlling a visual indicator provided on each of the plurality of player input devices to indicate to each player the current phase of the progressive jackpot game, allowing the input of a player for participating in the progressive jackpot game only in a specific subset of the plurality of progressive jackpot game phases, such that the system prevents the player from activating the input device associated with the player during the betting not allowed phase, administrating the corresponding cashless accounts for each player for each of the plurality of player input devices, and amending the cashless account according to the received respective player inputs, wherein amendment of the cashless account includes receiving a manual input by the dealer corresponding to the amount of money or tokens received by the dealer from the player.

2. The system for progressive jackpot gaming according to claim 1, wherein each of the plurality of player input devices are further arranged to indicate a winning of a respective player.

3. The system for progressive jackpot gaming according to claim 1, further comprising a central computer connected to each of the dealer consoles, the central computer being arranged to manage the progressive jackpot game, and to select one of the plurality of players randomly as a winner.

4. The system for progressive jackpot gaming according to claim 1, further comprising a central computer connected to each of the dealer consoles, the central computer being arranged to manage a plurality of progressive jackpot games, and to display the value of each of the plurality of progressive jackpot games.

5. The system for progressive jackpot gaming according to claim 1, further comprising a further indicator for indicating whether or not a player has placed a bet for the progressive jackpot game.

6. The system for progressive jackpot gaming according to claim 1, wherein multiple player inputs are allowed in the specific one of the plurality of progressive jackpot game phases.

7. The system for progressive jackpot gaming according to claim 1, wherein the indicator is a light emitting element integrated in the player input device.

8. The system for progressive jackpot gaming according to claim 7, wherein the indicator comprises a plurality of light elements.

9. The system for progressive jackpot gaming according to claim 1, wherein the indicator is arranged to provide a visual effect.

10. A method for playing a progressive jackpot game during the play of a casino game with a plurality of players, wherein the progressive jackpot game is a side-bet for the casino game, the method comprising the steps of:

receiving by a dealer money or tokens from a player, wherein the dealer is responsible for the progressive jackpot game, wherein the dealer updates the player's current account balance to correspond to the money or token received;

indicating the player's current account balance, and, upon receiving a player's input on a player input device for participating in the progressive jackpot game, deducting a predetermined amount from the player's account balance, and visually indicating a plurality of progressive jackpot game phases, wherein the plurality of phases of the progressive jackpot comprise:

a pre-start phase corresponding to a state in which a player is permitted to add credits to or activate a cashless account having credits associated therewith corresponding to the player;

a betting allowed phase corresponding to a state in which the player is permitted to select the amount of credits to bet, wherein a visual indication of the betting allowed phase is different than a visual indication of the pre-start phase; and a betting not allowed phase corresponding to a state in which the player is prohibited from adding credits to or activating the cashless account until the pre-start phases begins for subsequent rounds of the progressive jackpot game, wherein a visual indication of the betting not allowed phase is different than the visual indication of the betting allowed phase and the pre-start phase, and wherein the betting not allowed phase is initiated and ended by the dealer using a dealer console, wherein the player input device prevents the player from participating in the progressive jackpot game during the betting not allowed phase.

11. The method for playing a progressive jackpot game according to claim 10, wherein the indicating comprises providing a visual indication.

12. The method for playing a progressive jackpot game according to claim 10, wherein the player's account balance is an electronic account balance.

13. The method for playing a progressive jackpot game according to claim 10, wherein one of the plurality of players is randomly selected as a winner.

14. The method for playing a progressive jackpot game according to claim 10, further comprising the step of indicating whether or not a player has placed a bet for the progressive jackpot game.

15. The method for playing a progressive jackpot game according to claim 10, wherein a player is allowed to place multiple bets in the specific one of the plurality of progressive jackpot game phases.

16. The method for playing a progressive jackpot game according to claim 11, wherein the player's account balance is an electronic account balance.

17. The method for playing a progressive jackpot game according to claim 11, wherein one of the plurality of players is randomly selected as a winner.

18. A system for a progressive jackpot side-bet game associated with a casino game, the progressive jackpot side-bet game having at least three game phases, the system comprising one or more play tables, each play table comprising a dealer console and a plurality of player input devices connected to the dealer console, each of the player input devices being arranged to receive a respective player input and to indicate each of the at least three game phases, wherein the dealer console is operated by the dealer and is configured to:

receive input from a dealer concerning at least two of the at least three game phases, wherein the at least three game phases comprise:

a pre-start phase corresponding to a state of the system in which the system permits a player, using a player input device associated with the player, to add credits to or activate a cashless account having credits associated therewith corresponding to the player, the pre-start phase associated with a first visual indication displayed on the player input device associated with the player, wherein the pre-start phase is initiated by the dealer using the dealer console;

a betting allowed phase corresponding to a state of the system in which the system permits the player, using the player input device associated with the player, to select the amount of credits to bet, the betting allowed phase associated with a second visual indication displayed on the player input device associated with the player that is different than the first visual indication; and a betting not allowed phase corresponding to a state of the system in which the system prohibits the player from adding credits to or activating the cashless account with the player input device associated with the player, such that the system does not register any input on the input device associated with the player during the betting not allowed phase, wherein the betting not allowed phase is associated with a third visual indication displayed on the player input device associated with the player that is different than the first and second visual indications, and wherein the betting not allowed phase is initiated and ended by the dealer using the dealer console;

accepting input from the player on the player input device associated with the player for participating in the progressive jackpot side-bet game during the betting allowed phase, administrating the corresponding cashless accounts for each player for each of the plurality of player input devices, and amending the cashless account according to the received respective player inputs, wherein amendment of the cashless account includes receiving a manual input by the dealer corresponding to the amount of money or tokens received by the dealer from the player.

* * * * *

UNITED STATES PATENT AND TRADEMARK OFFICE

CERTIFICATE OF CORRECTION

PATENT NO. : 8,641,533 B2
APPLICATION NO. : 11/663308
DATED : February 4, 2014
INVENTOR(S) : Julio Cesar Araico Cao It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 819 days.

Signed and Sealed this
Twenty-second Day of September, 2015

Michelle K. Lee
*Director of the United States Patent and Trademark Office*